(12) United States Patent
Costas et al.

(10) Patent No.: US 8,564,152 B1
(45) Date of Patent: Oct. 22, 2013

(54) DUAL INTAKE WAVE ENERGY CONVERTER

(71) Applicants: Dan Nicolaus Costas, Apollo Beach, FL (US); Alexander Nicholas Costas, Apollo Beach, FL (US)

(72) Inventors: Dan Nicolaus Costas, Apollo Beach, FL (US); Alexander Nicholas Costas, Apollo Beach, FL (US)

(*) Notice: Subject to any disclaimer, the term of this patent is extended or adjusted under 35 U.S.C. 154(b) by 0 days.

(21) Appl. No.: 13/954,898

(22) Filed: Jul. 30, 2013

Related U.S. Application Data

(63) Continuation-in-part of application No. 13/757,621, filed on Feb. 1, 2013, now Pat. No. 8,525,364.

(60) Provisional application No. 61/634,105, filed on Feb. 23, 2012, provisional application No. 61/687,897, filed on May 3, 2012.

(51) Int. Cl.
*F03B 13/24* (2006.01)

(52) U.S. Cl.
USPC .................. 290/53; 290/42; 60/398; 60/497

(58) Field of Classification Search
USPC ................. 290/53, 54, 42, 43; 60/398, 497

IPC .............................................. F03B 13/10,13/14
See application file for complete search history.

(56) References Cited

U.S. PATENT DOCUMENTS

| | | | | |
|---|---|---|---|---|
| 4,095,423 A * | 6/1978 | Gorlov | ............................ | 60/398 |
| 4,098,081 A * | 7/1978 | Woodman | ........................ | 60/398 |
| 4,141,670 A * | 2/1979 | Russell | ......................... | 415/3.1 |
| 4,210,821 A * | 7/1980 | Cockerell | ....................... | 290/53 |

* cited by examiner

*Primary Examiner* — Vanessa Girardi
(74) *Attorney, Agent, or Firm* — Marc E. Hankin; Kevin Schraven; Jimmy Sauz

(57) ABSTRACT

This invention is an apparatus and method for harnessing water wave energy by transforming it into a continuous flow of water to be converted into mechanical work by means of a water turbine which in turn actuates a generator that transforms the work in to electrical energy. The wave energy device connects distanced water waves in a novel manner that allows them to power one another rather than only themselves alone. By interposing a turbine in the communicating flow of water that transmits power from each wave to the others energy can be siphoned from them and stored for human use.

22 Claims, 3 Drawing Sheets

DUAL INTAKE WAVE ENERGY CONVERTER

CROSS-REFERENCE TO RELATED APPLICATIONS

This is a Continuation in Part Application of U.S. Non-Provisional patent application Ser. No. 13/757,621, filed on Feb. 1, 2013, titled "APPARATUS FOR CONVERTING WAVE ENERGY," by inventors Dan Nicolaus Costas and Alexander Nicholas Costas, the contents of which are expressly incorporated herein by this reference. Priority is also claimed to U.S. Provisional Patent Application Ser. No. 61/634,105, filed on Feb. 23, 2012, titled "APPARATUS FOR CONVERTING WAVE ENERGY," by inventor Dan Nicolaus Costas, the contents of which are expressly incorporated herein by this reference. Priority is further claimed to U.S. Provisional Patent Application Ser. No. 61/687,897, filed on May 3, 2012, titled "APPARATUS FOR CONVERTING WAVE ENERGY," by inventors Dan Nicolaus Costas and Alexander Nicholas Costas, the contents of which are expressly incorporated herein by this reference.

FIELD OF INVENTION

This invention relates to the method and apparatus for converting water wave energy into electrical energy by harnessing the movement of water in such a wave. More particularly, the invention relates to a method and apparatus for converting the cyclic bursts of power given by waves into a continuous flow of water capable of powering a low head turbine.

BACKGROUND

For over a century, hundreds of inventions have attempted to harness the vast amount of energy in waves. Due to scarcity of resources and energy, a lot of effort has been directed towards tapping into the vast amount of unharnessed natural resources. One such form of unharnessed natural resources is in the form of wave energy.

Ocean's waves contain more energy that can be harnessed than wind and solar energy combined. This energy is constantly available and oceans cover over 70% of the earth's surface.

It has been estimated that waves can contain as much as 70 KW of power for every linear meter of wave; therefore a 15 meter long wavefront can deliver over 1 MW of power if its energy could be exploited in a practical manner. Even more power can be harvested per meter wavefront of sideflow from adjacent waves is taken in to account.

The methods currently employed for extracting the wave's energy fall basically in to four main categories:

Point absorbers, which are buoys using the heaving motion of the waves that is being converted to mechanical and then electrical energy, or directly to electrical energy like Power Buoy of Ocean Power Technology.

Attenuators, like McCabe's Wave Pump or "Pelamis" which use a few floating bodies hinged together which are in relative motion to each other due to the passing waves. At the hinging point, hydraulic pistons push oil in hydraulic motors which in turn actuate electric generators.

Terminators, like Oscillating Water Column (OWC) employed in the "Mighty Whale" Japanese project or in various shore based projects like the one on the Pico island.

Overtopping, employed either on shore or on a floating structure like the "Wave Dragon" Danish project which also involves Germany, Sweden, The UK, and Austria.

The first two categories employ mechanical devices that are inefficient and demand a high capital cost due to the demanding conditions out in the ocean. The seals needed, the inability to service on the spot, the dangerous conditions of even approaching the devices to be tugged for service make them undesirable as viable solutions. They also need a long "trial and error" validation period because they are not technologies that have stood the test of time.

The last two categories use the wave's energy to actuate air, and their water turbines actuate electrical generators. The current invention falls into this broad category, so this category will be further analyzed.

The OWC is mostly used on shores where a trapezoidal chamber communicates on the lower side with the sea water allowing the incoming wave to raise the inside level of water. When the wave retreats, on a through, the level of the water inside will drop. This raising and lowering of the water level inside the chamber acts as a piston, pushing and pulling the air above it through a narrow hole where a Wells turbine rotates, actuating an electric generator.

The Wells turbine, named after its inventor is a self-rectifying turbine, which rotates in the same direction regardless of the direction where the air is coming from. The advantage of this concept is a simple design that has no moving parts except the group of turbine-generator.

The disadvantages of this system are: low efficiency of the air turbine, a chamber of limited size which cannot be bigger than the order of magnitude of a wave which requires a separate chamber for each separate turbine-generator, chambers cannot be coupled to actuate one bigger turbine generator group, and lost kinetic energy of the wave because the separating wall of the chamber is always submerged.

The existing OWC systems are mostly placed on shore where the waves have already lost most of the energy they had in deep sea water. Also, the sites need to have a particular configuration, and typically involve expensive real estate.

Due to the fact that there is a significant period of time between waves and also because the wave's lowering is slower than the rising level inside the chamber, the Wells turbine tends to stall.

Another drawback is that because the air turbine is so noisy, this limits the number of sites where it can be implemented.

Overtopping is used on the "Wave Dragon", which is a floating structure that has a ramp (artificial beach) on which the wave climbs due to its kinetic energy and spills over into a basin above the sea water level. Then the water falls through a water turbine and actuates an electric generator much like in a regular hydro power plant. This simplicity is an advantage of the "Wave Dragon." Another obvious advantage of this design is the use of a technology that has long been used and perfected.

Water turbines which are suitable for this purpose have been used in low head river water power plants for many decades and have been developed to a high level of efficiency and reliability. In France the 240 MW La Rance tidal power station has been using such turbines in a salt water environment since 1967. Thus, in contrast to most of the WEC principles, a proven and mature technology can be used for the production of electrical energy.

Turbine operating conditions in a WEC are quite different from the ones in a normal hydro power plant. In the Wave Dragon, the turbine head range is typically between 1.0 and 4.0 m, which is on the lower bounds of existing water turbine experience. While there are only slow and relatively small variations of flow and head in a river hydro power plant, the strong stochastic variations of the wave overtopping call for a radically different mode of operation in the Wave Dragon. The head, being a function of the significant wave height, is varying in a range as large as 1:4, and it has been shown by Knapp (2005) that the discharge has to be regulated within time intervals as short as ten seconds in order to achieve a good efficiency of the energy exploitation.

A river hydro power plant which is properly maintained can have a life of 40-80 years. On an unmanned offshore device, the environmental conditions are much rougher, and routine maintenance work is much more difficult to perform. Special criteria for the choice and construction of water turbines for the Wave Dragon have to be followed; it is advisable to aim for constructional simplicity rather than maximum peak efficiency.

By stopping a number of turbines at lower flow rates, the flow rate can be regulated over a wider range without sacrificing efficiency. Single units can be taken out of service for maintenance without stopping production. Capacity demanded for hoisting and transport equipment to perform repair and maintenance work is greatly reduced. The smaller turbines have shorter draft tubes, and are thus easier to accommodate in the whole device. The smaller turbines have a higher speed, which reduces the cost of the generator. Another advantage of the Wave Dragon by being a floating structure is the possibility of being moored in deep waters where the energy of the wave is not diminished by the sea floor and there is no real estate cost involved.

There are quite a few important drawbacks of the overtopping devices, and in particular, the Wave Dragon.

The capacity of the water reservoir has to be significant to feed the turbine between two waves. It is 8,000 cubic meters which means over 8,000 tons of water to be lifted and held above the sea level in a precarious act of balancing. It is like a plate filled with water which easily will spill when shaken. The structure to hold all this weight becomes significantly bulky and expensive. The mooring lines and anchoring will have to be dimensioned accordingly mostly taking also in consideration the two floating wings that spread sideways to gather the waves giving a span of 300 meters to the whole structure.

Underneath there are pockets of air for lifting and lowering the structure such that always the ramp is at the proper height depending on the height of the incoming waves. If the ramp is too high, the incoming wave may not make it over or too little water will be added to the reservoir. If the ramp is too low, the water will just wash over the reservoir not giving enough head for the turbine.

A sophisticated "just in time" automation system will have to keep this huge structure in balance at all times since the level of the ramp has to continuously keep up with the surrounding conditions, the amount of momentary load (variations of thousands of tons of water weight of load on the structure in a matter of seconds between waves), the task of keeping an even keel, horizontal position at all times in choppy waters. The turbines are equipped with cylindrical vanes that close when there is not enough head and reopen when enough flow of water is assured. In stormy weather the structure sinks to a standby low profile by letting out the air of the air pockets.

Most of the kinetic energy of the incoming wave is cancelled by the vertical component of the ramp to push over the upper edge of the ramp from where the water falls to a lower level in the reservoir to a lower potential energy. This amounts to lower efficiency in the process of conversion of the wave's energy. If somehow, the top of the ramp could be continuously adjusted with the water level inside the reservoir, this would always be the optimum level over which the water in the wave will spill.

If also somehow the gap between the waves could be bridged, a continuous flow of water into the reservoir would keep up with the continuous demand of the turbine and the big buffering reservoir won't be necessary.

A more efficient less expensive structure would assure the continuous functioning of the already described water turbine generator group. The proposed invention solves these problems.

The invention assures the conversion of the kinetic and potential wave energy in a continuous flow of water feeding a water turbine.

Finally, the present invention is a significant improvement over U.S. Pat. No. 7,834,475, which was issued to Dan Nicolas Costas, a named inventor of the present invention. The present invention is able to collect significantly more water into the flow that is powering the turbines by allowing the side wave that is in the vicinity of the apparatus to enter the system as it travels along it, in addition to the portion of the wave front that hits the device frontally, and by accepting water from the top as well as from the bottom. Additionally, the present invention is simpler and less expensive to build due to the flap grid combination working as one way valves. Finally, the present invention may be modular and standardized and would therefore less expensive and easier to service.

SUMMARY OF THE INVENTION

To minimize the limitations of the prior art, and to minimize other limitations that will become apparent upon reading and understanding the present specification, the present invention is a method and apparatus for converting the energy of waves in a continuous flow of water capable to actuate a hydro turbine which in turn actuates an electrical power generator.

The generated flow of water powers preferably a plurality of hydro turbines, similar to any low head hydro power plant, thus using well verified and time tested technology.

Since the power of a turbine is directly proportional with the head and the debit of water, a high volume of water is needed for a significant amount of power. For this, the waves should be transformed as much as possible in a continuous and large flow of water.

Having electrical power generated on board, desalination, hydrogen generation and modular locative or industrial/agricultural spaces can be added and easily connected to the structure.

One embodiment of the invention is a device for converting the energy of waves in continuous flow of water comprising: one or more input channels; one or more output channels; one or more passages; one or more turbines; and one or more generators. The turbines are within the one or more passages. The input channels have one or more input valves on top and/or bottom. The one or more output channels have one or more output valves on top and/or bottom. The one or more input channels are connected to the one or more output channels through the one or more passages. The device for converting the energy of waves is submerged under a surface of a body of water and a plurality of waves passes over the device. The plurality of waves have a crest and a trough along each wave length, along each wavelength there are areas in which the water in the wave is moving directly upwards, and others in which the water in the wave is moving directly downwards. Intermediate to these areas will be areas in which the water will move in a direction such that it has a vertical and horizontal component to its velocity, and as such a vertical velocity gradient is present in the form of a wave that is out of phase with the crests and troughs. A horizontal velocity gradient is also present that is in phase with the crests and troughs of the wave. The length of the channels should cover a crest and a trough at all times for generating a continuous flow between the minima and maxima of the aforementioned velocity gradient. If this condition is not being met, the system will stall when it is underneath an area with insufficient water movement from the passing waves. A stream of water enters the one or more input channels through the one or more input valves caused by the movement of the passing wave in the vertical direction, wherein the stream of water is prevented from exiting through the one or more input valves such that the stream of water passes through the one or more passages to the one or more output channels and out through the one or more output valves. The stream of water is prevented from entering through the one or more output valves; and wherein the stream of water is converted into a usable energy source by the one or more turbines and the one or more generators. Preferably, the device further comprises a flotation device; wherein the device and the floatation device host one or more wind turbines and/or one or more water desalination facilities and/or one or more hydrogen making facilities and/or one or more lodging or dwelling units and/or one or more industrial facilities and/or one or more agricultural facilities and may or may not be self-propelled. Preferably, the one or more input valves are comprised of one or more input flaps and one or more input grills and the one or more output valves are comprised of one or more output flaps and one or more output grills; wherein the one or more input grills are preferably exterior to the one or more input flaps and wherein the one or more input grills prevent the one or more input flaps from opening outward; and wherein the one or more output grills are preferably interior to the one or more output flaps and wherein the one or more output grills prevent the one or more output flaps from opening inward. Preferably, the flotation device, wherein the device and the floatation device host one or more lodging or dwelling units, one or more hydrogen making facilities; one or more water desalination facilities; and one or more wind turbines; wherein the device and the floatation device provides an area of calm water feasible for aquaculture, water sports, and mooring facilities. The device may be part of a pier and/or affixed to the sea floor and/or part of a floating structure. The floating structure may travel on the water to deliver electric power and/or hydrogen and/or desalinated water to remote coastal locations. The floating structure may be geostationary under its own power. The floating structure may be a platform for one or more businesses selected from the businesses consisting of factories, aquaculture farms, and/or hydroponic farms, or any other feasible venture. The floating structure may be a breakwater to protect the seashore from erosion. The floating structure may be a hydrogen refueling station for vessels. The floating structure may be a prison or other correctional facility. The device may be a military base and/or airport and/or seaport. Because the device generates electricity, the floating structure may be self-powered.

It is an object of the present invention to overcome the limitations of the prior art.

These, as well as other components, steps, features, objects, benefits, and advantages, will now become clear from a review of the following detailed description of illustrative embodiments, the accompanying drawings, and the claims.

DETAILED DESCRIPTION OF THE DRAWINGS

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the screen shot and the detailed descriptions thereof, are to be regarded as illustrative in nature and not restrictive. Also, the reference or non-reference to a particular embodiment of the invention shall not be interpreted to limit the scope of the invention. It is the goal of this invention to provide a method of maximizing the conversion of wave's energy in a continuous flow of water that actuates one or more water turbines.

Figure 1:
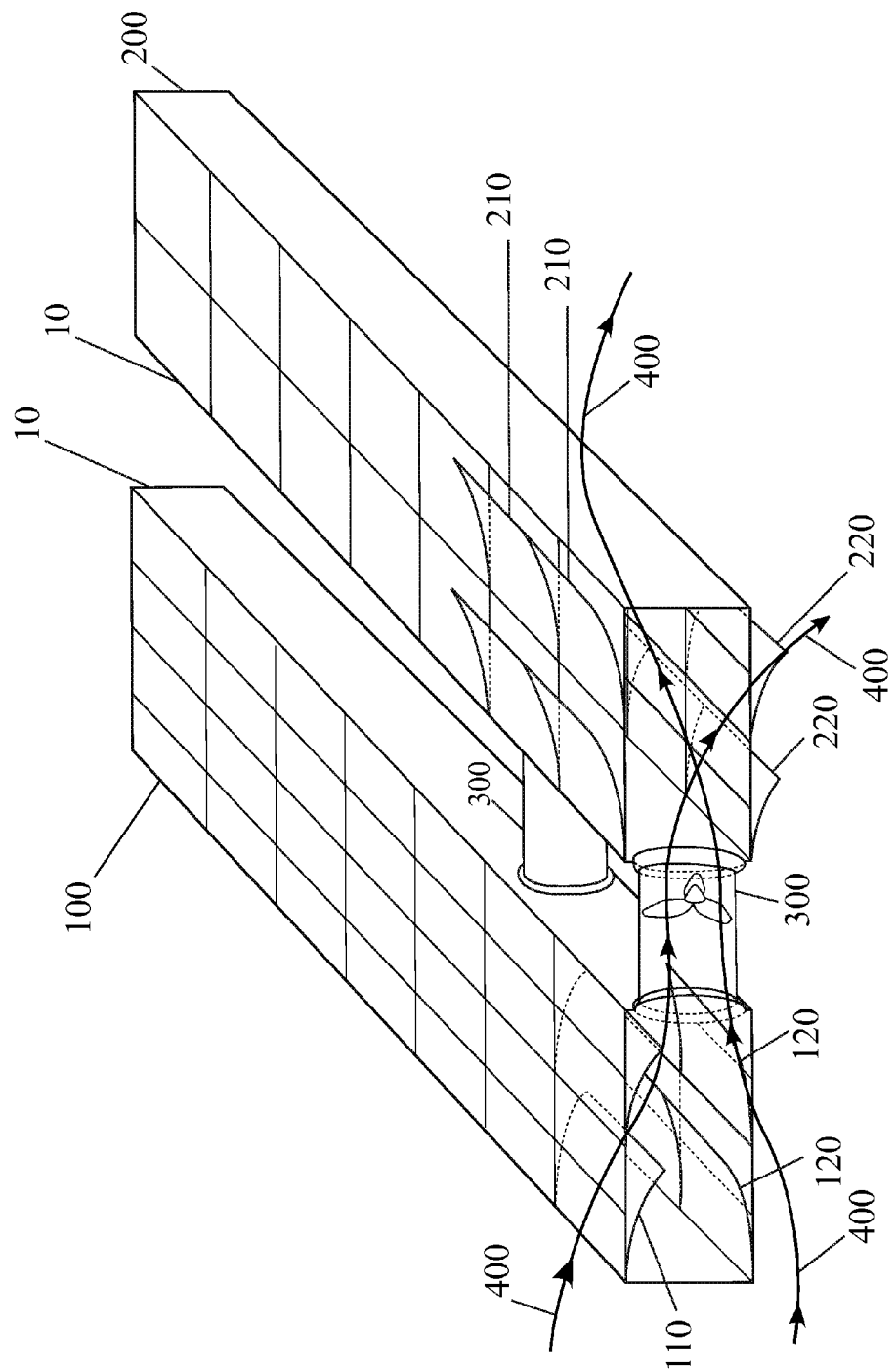
FIG. 1 is a section of a perspective view of the device for converting wave energy in a continuous flow of water capable of powering low head water turbines.

FIG. 1 is a prospective view of the energy wave device for converting wave energy in a continuous flow of water capable of powering low head water turbines. As shown in FIG. 1 the device 10 is comprised of one or more input channels 100 and one or more output channels 200. The input channel 100 is lined with a plurality of one way in 110 on its upper surface, facing the atmosphere, as well as its lower surface 120 facing the sea floor. As such the input valves 120 on the lower surface of the input channel 100 will open towards the atmosphere, that is, inwards, and the input valves on the upper surface 110 of the input channel 100 will open towards the sea floor, again in the inwards direction respective to the input channel. The configuration of the output valves 210 and 220 in the output channel 200 is inverted with respect to the input valves in the input channel such that the valves in the output channel are at all times facing the outward direction relative to the channel they are a part of. The input and output channels are connected by passages 300 where the stream of water 400 generated by the crest and trough as shown, actuates turbines that power generators by harvesting energy from the overpassing waves.

Figure 2:
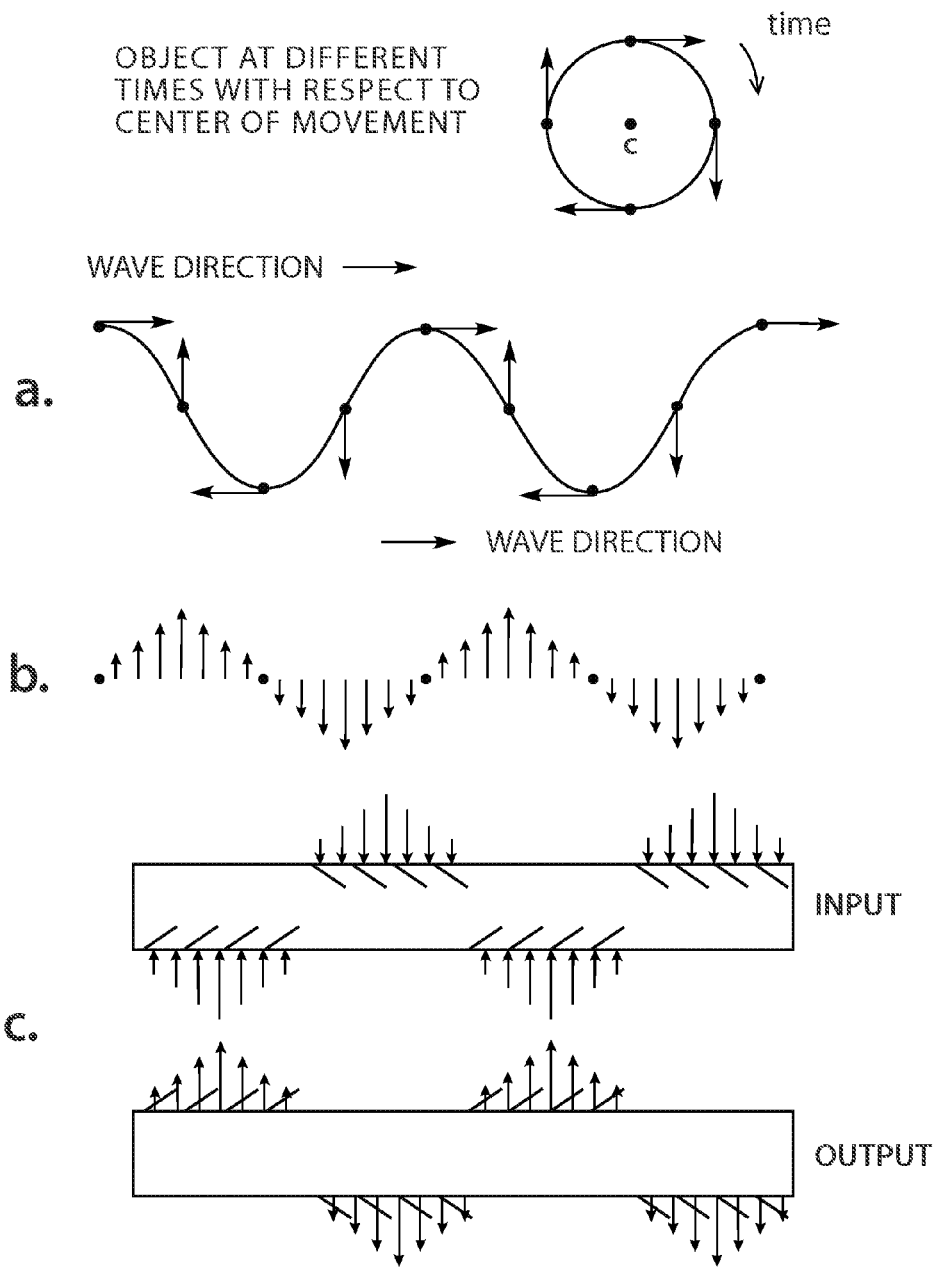
FIG. 2 is an illustration of how the wave powers the device at all times.

FIG. 2a shows the circular motion of an object, such as a molecule of water, in an ocean wave through time and its state at exemplary positions on a wave. This circular motion is sustained by the action of gravity on said object as well as on the water around it which employs forces affecting said object that compound in to a net force that is constantly at a right angle to the direction of its movement, and thus supplies the centripetal force to keep the object on a circular orbit.

The vertical and horizontal components of each water molecule's velocity over time form two waves, the progression of the horizontal component is in sync with the surface wave, whereas the vertical component is out of phase by 90 degrees, or one fourth of a wavelength. The wave of vertical velocity components is shown in FIG. 2b.

In FIG. 2c the relation of this wave of vertical velocity components to the wave energy converter is shown. At every point in the component wave there is a flow of water in to the input channel and a flow of water out of the output channel due to the nature of their constructions, except at the nodes of the wave. Due to the double-input and double-output construction of the input and output channel there will be a maxima of influx and efflux from the system at all times so long as it is at least one half of a wavelength long. This being the case, the devices can be half the length compared to single input (only top surfaces have one way in and one way out valves) and need to cover a full wave length to deliver the same power, therefore saving costs in materials Longer devices are preferred due to increased time for harvesting energy as well as increased side flow. Side flow is the phenomenon observed when waves passing over this system gradually have their energy harvested, and as such are reduced in magnitude. Ocean waves have long wave fronts, and if a part of the wave front is diminished in magnitude, then water will flow from the parts of the wave front that are of larger magnitude in order to replenish that which is diminished. Over time this has the effect of reestablishing an uninterrupted wave front of uniform wave height. This is well supported by observation and longstanding theory, most notably that of elementary waves—a wave that passes around a pole rejoins after passing the pole, rather than continuing with a hole in the wave front.

Side flow allows the device to harvest energy not only from the wave front passing over the device, but effectively from the entire wave front in the vicinity. Compounded with the ability to harvest energy over an extended period of time by making the device many wavelengths long, effectively the wave energy converter outlined in this patent integrates the flows of water throughout a wave front in to a consolidated stream of water passing through a turbine. If made long enough the device could harvest all of the wave's energy and cancel out any wave propagation in its vicinity.

Figure 3:
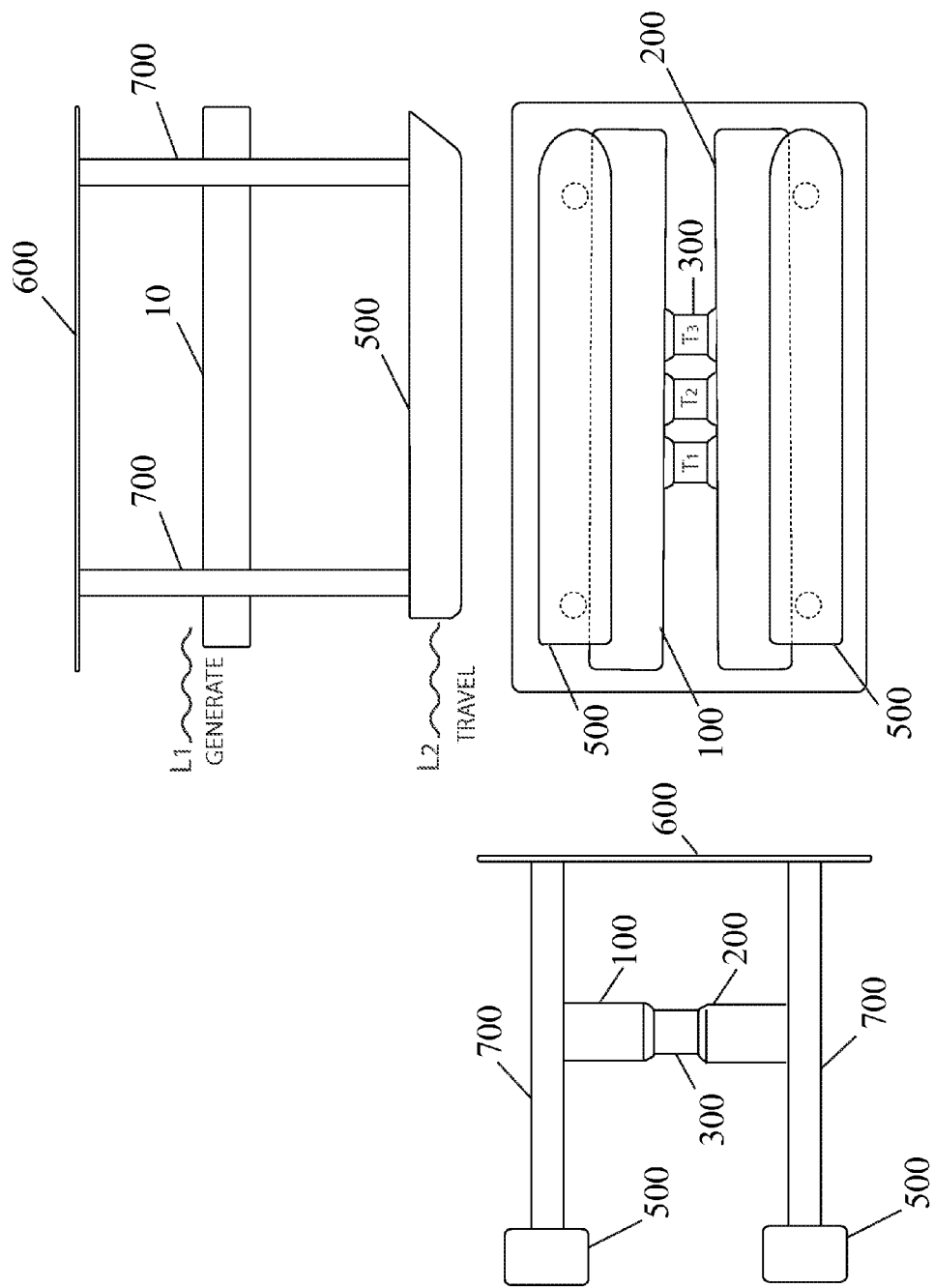
FIG. 3 is a way in which the device can be made, such that it is mobile and autonomous.

FIG. 3 depicts a possible embodiment of the device

Most of the applications should use the floating configurations, similar with the semi submerged platforms, where the wave energy device is being held submerged by floating means 500. The floating means should be designed such that they can accept ballast water for submerging the wave energy device 10 to the L1 level where it can generate energy from the waves overpassing it and discharge water for raising the wave energy device to L2 level for service and towing purposes. These are well known techniques in the industry and therefore don't need to be detailed. The floating means having an adjustable elevation can take additional variable loads, like a raised platform 600 sustained by hollow pipes 700 on which dwelling and service facilities can be built, facilities for hydrogen making, desalinating water or any other business like factories or hydroponic/agricultural facilities. The device 10 should be spaced apart from platform such that the waves cannot reach the platform while the device is submerged for power generation. The device 10 also should be spaced enough from the floating means (which can be joined to form just one unit, like a submerged barge) such that the floating means do not affect significantly the power of the waves around the device 10. These floating islands can be moored in deep water not too far from shore for delivering power to the grid through subsea cables or they can sail under their own power to coastal locations to deliver services like electric power or desalinated water. Alternately, they can be geostationary and deliver services as refueling stations or prisons/correctional facilities in the middle of the sea or ocean. Since they absorb the energy inherent to the waves, the water behind them is relatively smooth and can be used for aquaculture, mooring vessels or floating apartments hooked to services as electric power, desalinated water, and sewer.

Because the water being traversed by waves is calmed by their absorption in to the wave energy device the area past the wave energy device will smoothly facilitate aquaculture and mooring of vessels and floating dwelling units.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A device for converting wave energy in a continuous flow of water comprising:
    one or more input channels;
    one or more output channels;
    one or more passages;
    one or more turbines; and
    one or more generators;
    wherein said one or more generators are configured to generate an electricity;
    wherein said one or more generators are connected to said one or more turbines;
    wherein said one or more turbines are located within said one or more passages;
    wherein said one or more passages have a first end and a second end;
    wherein said one or more input channels and said one or more output channels are connected to said one or more passages, such that said first end of said one or more passages is connected to said one or more input channels and said second end of said one or more passages is connected to said one or more output channels;
    wherein said one or more input channels comprise a top surface and a bottom surface;
    wherein said top surface and said bottom surface of said one or more input channels comprise of one or more input valves;
    wherein said one or more output channels comprise a top surface and a bottom surface;
    wherein said top surface and said bottom surface of said one or more output channels comprise of one or more output valves;
    wherein said one or more input channels are configured to receive a first stream of water, such that said first stream of water passes through said one or more input valves of said bottom surface and exits through said one or more output valves of said one or more output channels;

wherein said one or more input channels are configured to prevent said first stream of water from exiting through said one or more input valves and redirects said first stream of water to pass through said one or more passages and out of said one or more output valves of said one or more output channels;

wherein said one or more output valves of said top surface and said one or more output valves of said bottom surface are configured to prevent said first stream of water from reentering said one or more output channels;

wherein one or more input channels are configured to receive a second stream of water, such that said second stream of water passes through said one or more input valves of said top surface and exits through said one or more output valves of said one or more output channels;

wherein said one or more input channels are configured to prevent said second stream of water from exiting through said one or more input valves and redirects said second stream of water to pass through said one or more passages and out of said one or more output valves of said one or more output channels;

wherein said one or more output valves of said bottom surface and said one or more output valves of said top surface are configured to prevent said first stream of water from reentering said one or more output channels; and wherein said first stream of water and said second stream of water are converted into a usable energy source by said one or more turbines and said one or more generators.

2. The device in claim 1, further comprising a floatation device;
wherein said floatation device prevents said device for converting wave energy from sinking.

3. The device in claim 2, further comprising one or more wind turbines;
wherein said one or more wind turbines is configured to converts wind energy to electrical energy.

4. The device in claim 2, further comprising one or more desalination facilities;
wherein said one or more water desalination facilities are configured to convert a saltwater into a freshwater for consumption.

5. The device in claim 2, further comprising one or more hydrogen making facilities;
wherein said one or more hydrogen making facilities are configured to create hydrogen.

6. The device in claim 2, further comprising one or more dwelling units;
wherein said one or more dwelling units are configured to house one or more people.

7. The device of claim 1, wherein said one or more input valves are comprised of one or more input flaps and one or more input grills;
wherein said one or more output valves are comprised of one or more output flaps and one or more output grills;
wherein said one or more input grills are positioned outside relative to said one or more input flaps, such that said one or more input grills prevent said one or more input flaps from opening outward; and
wherein said one or more output grills are positioned inside relative to said one or more output flaps, such that said one or more output grills prevent said one or more output flaps from opening inward.

8. The device in claim 7, further comprising a floatation device;
wherein said floatation device prevents said device for converting wave energy from sinking.

9. The device in claim 8, further comprising one or more wind turbines;
wherein said one or more wind turbines is configured to converts wind energy to electrical energy.

10. The device in claim 8, further comprising one or more water desalination facilities;
wherein said one or more water desalination facilities are configured to convert a saltwater into a freshwater for consumption.

11. The device in claim 8, further comprising one or more hydrogen making facilities;
wherein said one or more hydrogen making facilities are configured to create hydrogen.

12. The device in claim 8, further comprising one or more dwelling units;
wherein said one or more dwelling units are configured to house one or more people.

13. The device of claim 1, further comprising an area of calm water feasible for aquaculture, water sports, and mooring facilities.

14. The device of claim 1, wherein said device is configured to be part of a pier.

15. The device of claim 1, wherein said device is configured to be affixed to a sea floor.

16. The device of claim 1, wherein said device is configured to be a part of a floating structure.

17. The device of claim 16, wherein said floating structure is configured to move said device for converting wave energy through said body of water, such that said device for converting wave energy travels on said body of water to deliver electric power and desalinated water to one or more remote coastal locations.

18. The device of claim 16, wherein said floating structure is geostationary.

19. The device of claim 16, wherein said floating structure is a platform for one or more businesses selected from the group of businesses consisting of: one or more factories, one or more aquaculture farms, and one or more hydroponic farms.

20. The device of claim 16, wherein said floating structure converts one or more waves to energy to power equipment.

21. The device of claim 16, wherein said floating structure is a refueling station for vessels.

22. The device of claim 16, wherein said floating structure is a prison.

* * * * *